May 11, 1948. N. FRYE 2,441,265
POWER TRANSMISSION SHAFT
Filed May 2, 1946
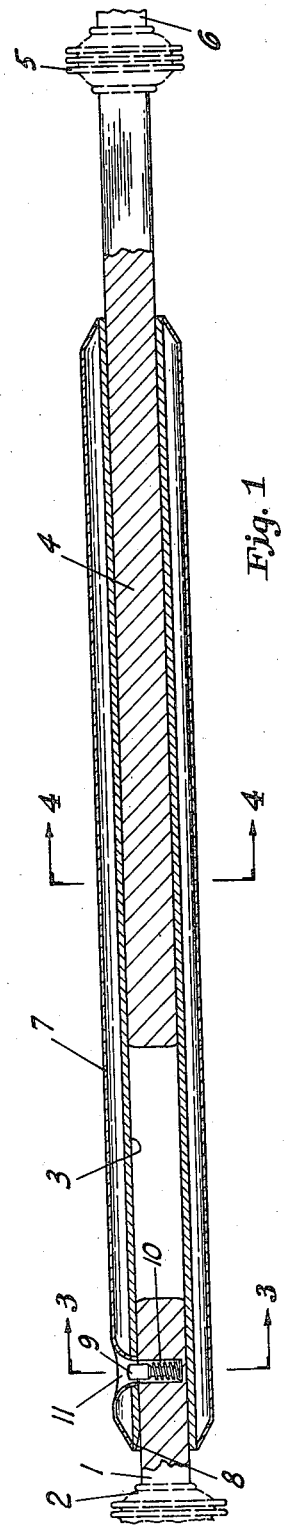
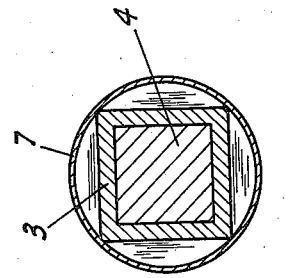
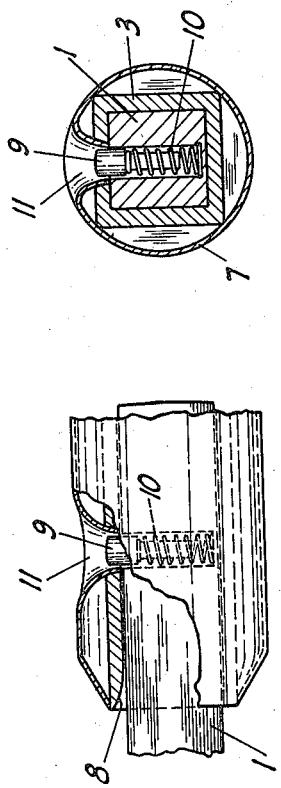
INVENTOR
NORMAN FRYE
BY Merrill M. Blackburn
ATTORNEY Patented May 11, 1948

2,441,265

UNITED STATES PATENT OFFICE 2,441,265

POWER TRANSMISSION SHAFT

Norman Frye, Davenport, Iowa

Application May 2, 1946, Serial No. 666,733

2 Claims. (Cl. 64—23)

The present invention pertains to means for transmitting power from a power producing mechanism, for example, a tractor, to a power utilizing mechanism, such as a combine, a bailer, a corn picker, or any other unit which must be pulled by a traction vehicle and simultaneously, while being pulled, utilizing power transmitted by the power generating unit. Various power transmission units have been designed but, on the whole, they have been unsatisfactory for the reason that they were angular in shape or had parts projecting from the surface thereof which would catch clothing and result in injury to a person unfortunate enough to have his clothing thus caught.

The present invention is similar to and an improvement upon the structure shown in Frye Patent No. 2,329,601, issued September 14, 1943. It was found, in practical use of that power transmission means that there were times when the two sections of the shaft would become disconnected when making a very short turn. It is the purpose of this invention to obviate that difficulty. Other objects of this invention are to provide a structure which is simpler and less expensive to manufacture, and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 represents a longitudinal section of a structure embodying my present invention;

Fig. 2 represents an enlarged fragmentary portion of the left end of the structure shown in Fig. 1;

Fig. 3 represents a cross-section taken substantially along the plane indicated by the line 3—3, Fig. 1; and Fig. 4 represents a cross-section taken substantially along the plane indicated by the line 4—4, Fig. 1.

Reference will now be made in greater detail to the annexed drawings for a more complete description of this invention. A stub-shaft 1 is connected through a universal 2 to the power shaft of a power generating unit, for example, a tractor. This stub-shaft is connected through an angular hollow shaft 3 with a section of the drive shaft 4 which is connected through a universal 5 to the power input 6 of the drawn vehicle. A sleeve 7 surrounds the shafts 3 and 4 and has its ends bent inwardly to engage the outer faces of the square shaft 3, being welded thereto to hold the parts in rigidly assembled relation. As shown at 8, the inner surface of the hollow shaft 3 is beveled to assist in sliding this shaft over the spring-actuated button 9 which serves to secure the connecting shaft 3 against inadvertent separation from the stub-shaft 1.

The latching finger piece or spring-actuated button 9 may be held against inadvertent disconnection from the stub-shaft 1 in any suitable manner. For example, the coil at the inner end of the spring 10 may be made of slightly greater diameter than the hole in which this spring is received and then, when it is forced in, it will retain its position therein. The outer end of this spring may be bent at an angle to enter a hole in the reduced end portion of the finger piece 9. Various other modes of securing the finger piece in place may be resorted to and I have given the foregoing merely as illustrative of one way in which this can be done. In order to make it possible to easily manipulate the latch or finger piece 9, the wall of the thin-walled pipe or sleeve 7 has a depression 11 formed therein, enabling the operator to press the plunger 9 in by means of a finger. Since the pipe 7 is merely a guard for the sharp angles of the power transmitting shaft and normally transmits none of the driving torque, it may be made of a thin material.

In making use of this construction, the tractor is backed into or substantially into hitching position and then the hitch unit 3, 4, 7 is lined up with the stub-shaft 1. Then the hollow shaft comprising the parts 3 and 7 is moved forward with the bevel 8 on the same side of the stub-shaft 1 as the plunger 9. Then the hollow shaft is moved forward until the plunger 9 snaps into the opening through the wall of the shaft 3. Then the traction hitch between the tractor and the drawn implement may be connected in the usual manner, the tractor being backed up, if necessary. However, the order of connecting the units, as just stated, may be reversed, the traction unit being connected to the drawn implement first and then the power transmission shaft being connected in driving relation.

It is therefore clear that there is provided by this construction an easy means of connecting the power transmission unit of a tractor with the drive shaft of a drawn implement. It is also clear that I have provided a structure for the purpose indicated which is easily fabricated and inexpensive to manufacture. Furthermore, since there is a variation in the length of hitch between tractors and drawn machines, it is necessary, sometimes, to adjust the length of the power transmission shaft, if this distance happens to be too short for the length of the shaft as manufactured. If the inner ends of the shafts 1 and 4 contact when the tractor and machine are hitched, it is necessary to reduce somewhat the length of the shaft 7. This can be done by cutting off a piece of the inner end of the shaft 4 so that there will be at all times a gap between the shafts 1 and 4 when the tractor and drawn implement are connected. It is also clear that there is enough of the length of the shaft 4 within the shaft 3 that, no matter how short the vehicle may turn, the shaft 4 will not be withdrawn from the shaft 3. Another advantage of this structure is that it permits the easy connection of tractor and drawn vehicle by one man, thus doing away with the necessity for a second man, as is common with other power transmission means for transmitting power from a tractor unit to a drawn implement. Furthermore, the use of a short shaft connected to the power unit eliminates the danger to the operator, present when a long shaft is used on the tractor take-off and the clutch is not disengaged when the tractor and drawn implement are disconnected, or the tractor engine is started with the clutch engaged.

It is of course understood that the specific description of structure set forth above may be departed from without departing from the spirit of this invention as disclosed herein and as defined in the appended claims.

Having now described my invention, I claim:

1. A power transmission shaft comprising a pair of shafts of non-circular configuration in cross-section, one of them being relatively short and the other one relatively long, the short shaft being connected to the power transmission unit of a traction unit, and the long shaft being connected to the power input of a drawn implement, a hollow connecting shaft having substantially the same internal configuration as the external configuration of said short and long shafts, said short shaft being provided with latching means by which it may be attached to the connecting shaft, and a guard pipe surrounding and attached at its ends to said connecting shaft, the long shaft being slidable within the connecting shaft as the direction of travel of the traction unit is changed relatively to the drawn implement.

2. A power transmission shaft comprising a pair of shafts of non-circular configuration in cross-section, one of them being relatively short and the other one relatively long, the short shaft being connected to the power transmission unit of a traction unit, and the long shaft being connected to the power input of a drawn implement, a hollow connecting shaft having substantially the same internal configuration as the external configuration of said short and long shafts, said short shaft being provided with latching means by which it may be attached to the connecting shaft, and a guard pipe surrounding and attached at its ends to said connecting shaft, the long shaft being slidable within the connecting shaft as the direction of travel of the traction unit is changed relatively to the drawn implement, the guard pipe having an opening in the wall thereof in a position to be engaged by said latching means when the short shaft is inserted into the end of the connecting shaft, the wall of the guard pipe around said opening being pressed inwardly to form a depression around the latching means, enabling the user to press the latching means inwardly for the release of the connecting shaft from the short shaft.

NORMAN FRYE.

REFERENCES CITED

The following references are of record in the file of this patent:

UNITED STATES PATENTS

| Number | Name | Date |
| --- | --- | --- |
| 1,721,740 | Klausmeyer | July 23, 1929 |
| 1,935,811 | Metcalf | Nov. 21, 1933 |
| 1,966,740 | Sipp | July 17, 1934 |